Figure 1:
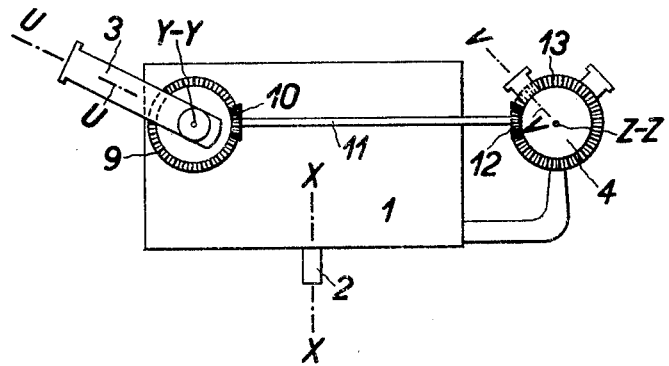
Figure 2:
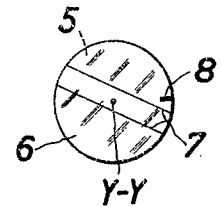

March 1, 1932.  S. J. VAN DEN BERGH  1,847,734

ANTIAIRCRAFT FIRE CONTROL APPARATUS

Filed May 28, 1931

Inventor:
S. J. van den Bergh
Samuel Johannes van den Bergh

Patented Mar. 1, 1932

1,847,734

UNITED STATES PATENT OFFICE

SAMUEL JOHANNES VAN DEN BERGH, OF THE HAGUE, NETHERLANDS, ASSIGNOR TO THE FIRM N. V. NEDERLANDSCHE INSTRUMENTEN-COMPAGNIE, OF THE HAGUE, NETHERLANDS

ANTIAIRCRAFT FIRE-CONTROL APPARATUS

Application filed May 28, 1931, Serial No. 540,759, and in the Netherlands May 27, 1930.

The invention concerns an anti-aircraft fire-control apparatus with two telescopes, for instance a rangefinder and a sighting telescope which are interconnected for equal lateral rotation and allow of being adjusted independently of each other with respect to the altitudinal angle.

According to the invention one telescope (the sighting telescope) has in its image plane two mark systems whereof one is fixed relatively to the telescope while the carrier of the other is coupled to the other telescope (the rangefinder) in such a manner that altering altitudinal angle of this other telescope imparts this carrier an adjustment which, according to the chosen construction, may be a turning of a longitudinal movement. The two mark systems must be so arranged that their mutual positions allow of determining the sense in which the altitudinal angle of the telescope containing the mark systems (the sighting telescope) must be altered in order to have the telescopes so directed that their axes are parallel to each other.

The invention applies especially to that construction of fire-control apparatus of this kind in which the sighting telescope is coupled in the known manner with a triangle device for presenting a rectangular triangle the two sides of which correspond to the altitude of the aerial target, which has to be ascertained by means of the rangefinder, and to the horizontal distance of this target from the fire-control apparatus. If the triangle device of a fire-control apparatus of the said construction is wrongly adjusted according to a wrong rangefinder measurement it may frequently happen that the sighting telescope is given a direction in which the target is no longer seen in the field of view. In order to bring in this case the target back into the field of view of the sighting telescope it has been necessary to read the altitudinal angle at the rangefinder and to call it out to the observer at the sighting telescope, who had to adjust this angle. This rather troublesome proceeding is greatly simplified by the invention which permits the observer at the sighting telecope to ascertain at once by means of the mutual positions of the two mark systems, and without taking his eyes from the ocular, in what sense he has to turn the sighting telescope in order to have it pointed at the target.

In the accompanying drawing which illustrates the invention, 1 is the casing of an anti-aircraft fire-control apparatus. This casing is provided with a pinion 2 which is to be assumed to be mounted for azimuthal rotation about a perpendicular axis X—X in a support not represented in the drawing. On the casing 1 are mounted, a sighting telescope 3 which is rotatable about an axis Y—Y perpendicularly crossing the axis X—X, and a rangefinder 4 rotatable about an axis Z—Z parallel to the axis Y—Y. The objective axes U—U and V—V of the two observing instruments 3 and 4, respectively, are therefore always in vertical planes which are parallel to each other. The telescope 3 is to be looked in from the side; its ocular axis coincides with its turning axis Y—Y. The image plane of the telescope 3 is to be assumed to be perpendicular to the ocular axis. The telescope 3 contains two glass plates, 5 and 6, whereof 5 is to be assumed to be fixedly disposed in the telescope and provided with two parallel lines 7 symmetric to the ocular axis (and consequently also to the turning axis Y—Y), and whereof 6 is to be assumed to be rotatable relatively to the telescope 3 about the axis Y—Y, and to have a radial line 8. The surfaces of the glass plates 5 and 6, which are provided with the lines 7 and 8, are to be assumed to lie near the image plane of the telescope 3. The rotatable glass plate 6 is rigidly connected to a bevel wheel 9 meshing with a bevel wheel 10. This bevel wheel 10 is fixed to one end of a shaft 11 which has at its other end a second bevel wheel 12 meshing with a bevel wheel 13 rigidly connected to the rangefinder 4. The ratio of gearing is so chosen that the glass plate 6 turns about the axis Y—Y always by the same angle as the rangefinder 4 about the axis Z—Z, and the radial line 8 is so provided on the glass plate 6 that it is between the lines 7 of the fixed glass plate 5 as soon as the objective axis U—U of the telescope 3 is parallel to the objective axes V—V of the rangefinder 4. In this way, when the parallelism of the axes U—U and V—V has been lost, it is possible to restore it without the necessity of troublesome manipulations.

I claim:

An anti-aircraft fire-control apparatus, comprising a casing mounted for rotation about a vertical axis, two telescopes mounted on this casing for rotation about horziontal axes, a mark system fixedly provided in the image plane of one of the two telescopes, another mark system being movably disposed in this image plane, and means for coupling this movable mark system to the other telescope so as to impart this mark system an adjustment as soon as the said other telescope is turned about its horizontal axis.

SAMUEL JOHANNES van den BERGH.